US011983858B2

(12) United States Patent
Verschaeve (10) Patent No.: US 11,983,858 B2
(45) Date of Patent: May 14, 2024

(54) REAL-TIME DATA ACQUISITION AND VISUALIZATION FOR POINT-CLOUD RECORDING

(71) Applicant: MY VIRTUAL REALITY SOFTWARE AS, Oslo (NO)

(72) Inventor: Joris Constant Gaston Verschaeve, Oslo (NO)

(73) Assignee: MY VIRTUAL REALITY SOFTWARE AS, Oslo (NO)

( * ) Notice: Subject to any disclaimer, the term of this patent is extended or adjusted under 35 U.S.C. 154(b) by 726 days.

(21) Appl. No.: 17/106,078

(22) Filed: Nov. 28, 2020

(65) Prior Publication Data

US 2021/0166372 A1 Jun. 3, 2021

(30) Foreign Application Priority Data

Nov. 29, 2019 (EP) .................................... 19212649

(51) Int. Cl.
*G06T 7/00* (2017.01)
*G01S 17/894* (2020.01)
(Continued)

(52) U.S. Cl.
CPC .......... *G06T 7/0004* (2013.01); *G01S 17/894* (2020.01); *G06F 9/3885* (2013.01);
(Continued)

(58) Field of Classification Search
CPC ... G06T 7/0004; G01S 17/894; G06F 9/3885; G06F 9/4881
(Continued)

(56) References Cited

U.S. PATENT DOCUMENTS 5,818,469 A 10/1998 Lawless et al.
8,391,610 B2 3/2013 Wheeler et al.
(Continued)

FOREIGN PATENT DOCUMENTS

EP 3579194 A1 12/2019

OTHER PUBLICATIONS

Extended European Search Report dated Mar. 31, 2020 as received in Application No. 19212649.8.
(Continued)

*Primary Examiner* — Prabodh M Dharia
(74) *Attorney, Agent, or Firm* — Maschoff Brennan (57) ABSTRACT

A method for real-time acquisition of point-cloud data of an ongoing scanning process, comprising a recording phase iteratively performed using an external-memory algorithm comprising an acquisition pipeline performed with parallel threads and an eviction pipeline, wherein a master thread comprises processing a master tree and a node cache, wherein the acquisition pipeline comprises continuously receiving the point-cloud data in input buffers, computing a local tree for each of a plurality of local threads, redistributing the point-cloud data onto local nodes, determining, for each local node whether the master tree comprises a corresponding node or not, either adding the point cloud data or creating the corresponding node in the master tree, wherein the eviction pipeline comprises evicting, during the ongoing scanning process, point cloud data from the node cache and writing it to one or more hard drives.

15 Claims, 4 Drawing Sheets

(51) Int. Cl.
*G06F 9/38* (2018.01)
*G06F 9/48* (2006.01)

(52) U.S. Cl.
CPC .. *G06F 9/4881* (2013.01); *G06T 2207/10028* (2013.01); *G06T 2207/30184* (2013.01)

(58) Field of Classification Search
USPC ........................................................ 345/418
See application file for complete search history.

(56) References Cited

U.S. PATENT DOCUMENTS

| | | | |
|---|---|---|---|
| 2005/0203930 A1* | 9/2005 | Bukowski | G06F 16/29 |
| 2010/0085353 A1 | 4/2010 | Zhou et al. | |
| 2013/0235050 A1 | 9/2013 | Karras | |
| 2015/0026412 A1 | 1/2015 | Eads et al. | |
| 2016/0275719 A1* | 9/2016 | Oke | G06T 17/005 |
| 2017/0249401 A1* | 8/2017 | Eckart | G06V 10/7625 |
| 2018/0350044 A1* | 12/2018 | Ponto | G06T 15/00 |
| 2019/0080483 A1 | 3/2019 | Mammou et al. | |
| 2020/0027248 A1 | 1/2020 | Verschaeve et al. | |
| 2020/0304773 A1* | 9/2020 | Tomkevicius | H04N 13/128 |
| 2021/0096958 A1* | 4/2021 | Kumar | G06F 16/128 |
| 2022/0285009 A1* | 9/2022 | Sha | G06T 7/344 |

OTHER PUBLICATIONS

H. Samet, Foundations of Multidimensional and Metric Data Structures, Morgan Kaufmann, Aug. 22, 2006.

G. M. Morton, A computer oriented geodetic data base; and a new technique in file sequencing. Technical report, International Business Machines Co. Ltd, 150 Laurier Avenue, West, Ottawa 4, Ontario, Canada, Mar. 1, 1966.

J. M. Kontkanen, E. Tabellion, R. S. Overbeck, Coherent out-of-core point-based global illumination, Jul. 19, 2011.

D. Martinez-Rubi et al., Taming the beast: Free and open-source massive point cloud web visualization. SemanticScholar, Nov. 2015.

* cited by examiner

Fig. 4

REAL-TIME DATA ACQUISITION AND VISUALIZATION FOR POINT-CLOUD RECORDING

CROSS-REFERENCE TO RELATED APPLICATIONS

This application claims priority to European Patent Application No. 19212649.8, filed on Nov. 29, 2019. The foregoing patent application is herein incorporated by reference.

FIELD OF INVENTION

The invention pertains to methods and algorithm to produce a Level-of-Detail (LOD) structure during scanning of a three-dimensional (3D) environment, thereby allowing visualization of the point cloud while the scanning process is still running In particular, a data acquisition algorithm is presented for processing point-cloud data continuously into an LOD structure, for instance in the form of an octree, the LOD structure being suitable for visualization and analysis by neural networks. This allows for coupling visualization and analysis already during the scanning or recording of point-cloud data. Moreover, advantageously, directly after the scanning has been completed, the point cloud can be used without the need for further conversion. The point cloud can be generated by different kind of data sources, such as light detection and ranging (LIDAR) scanning or photogrammetry. If the amount of data is very large, the entire data cannot fit into a computer system's volatile memory such as random access memory (RAM) or graphics memory. Therefore, an out-of-core algorithm utilizing hard disks (or other non-volatile memory) is employed to store data.

BACKGROUND

Generally, point clouds, representing data points in space, are produced by 3D scanning devices measuring and collecting three-dimensional point information. Such point clouds are used across many technical fields including but not being limited to creating 3D CAD models e.g. in part manufacturing, to metrology and quality control related tasks or to geodesy projects. Thereby, in most cases an efficient visualization of the point cloud is of critical importance.

For example, LIDAR systems represent a special kind of 3D scanning devices which measure space to such a high level of detail that the resultant massive amount of points, the so-called point cloud, can appear as a coherent scene in the manner of a pointillist painting.

The produced point clouds or sets of echoes are data sets representing points, the position, distance and optionally intensity and colour values of which are sensed by the system.

Typically, LIDAR systems collect data by transforming raw sensor data into point data that have three position coordinates x, y, and z. The raw sensor data is expressed in spherical coordinates: a first angle that represents the angle of rotation about a vertical axis, a second angle that represents the angle of rotation about a horizontal axis and a range or distance. The angle coordinates correspond with the LIDAR components that determine the direction of an emitted measurement radiation pulse. These spherical coordinates are then transformed into Cartesian coordinates, which are more convenient for later operations on the data.

After collection, the point-cloud data files must usually be processed e.g. spatially indexed and/or compressed for efficient 3D visualization of the collected data—especially in view of using mobile devices for visualization having limited computing resources. Depending on the amount of collected data, several days of computing time can elapse on a desktop computer in order to look at all the data in 3D.

Because very high data collection rates are now achievable with 3D scanning devices, the storage and especially the handling of the immense amount of data is challenging. A method for pre-processing point clouds comprising large amounts of point data is disclosed in the European patent application No. 18176796.3. Said method comprises converting the points' coordinates to Morton indices, sorting the Morton indices and determining, based on a predefined criterion, intervals by a walk-through (sequential scan) of the sorted array of Morton indices. The resulting intervals define the leaf nodes and form the basis and starting point for a subsequent generation of a tree index structure comprising the leaf nodes, nodes, branches and nodes connecting the branches (branch nodes). Point data contained within nodes and/or sub-trees of a node can be quantized, allowing for lossy or lossless compression. The pre-processing thereby enables a subsequent efficient visualization of the point cloud data for example on desktop and mobile devices.

BRIEF DESCRIPTION

There is a need for an algorithm that allows visualizing massive point clouds (i.e. point clouds that cannot be stored in a GPU or RAM) even before a scan delivering the point-cloud data has been finished.

It is therefore an object of some aspects of the present invention to an improved method, algorithm and computer system for acquisition and visualization of point-cloud data.

It is another object to provide such a method, algorithm and system that allow real-time acquisition and visualization of point-cloud data of an ongoing scanning process.

It is another object to provide such a method, algorithm and system that allow processing point-cloud data continuously into an LOD structure that is suitable for visualization and analysis by neural networks.

It is moreover an object to provide such a method, algorithm and system that are suitable for use with very large datasets, i.e. datasets that are too large to fit into a system's volatile memory.

At least one of these objects is achieved by the method according to claim 1, the computer system according to claim 14, the computer programme product according to claim 15 and/or the dependent claims of the present invention.

A first aspect of some aspects of the invention relate to a computer-implemented method for real-time acquisition and visualization of point-cloud data of an ongoing scanning process, the point-cloud data comprising coordinates for a multitude of points. The method comprises providing a node cache and providing an LOD structure having a master tree and a local structure comprising a plurality of local trees. The LOD structure for instance can be an octree structure, wherein the local structure is a local octree structure and the master tree and local trees are octrees. The method further comprises visualizing at least a subset of the point-cloud data to a user before the ongoing scanning process ends.

In particular, the node cache and the LOD structure are provided in a volatile memory, e.g. a graphics memory or RAM, said volatile memory being not large enough to store the complete point-cloud data.

The method according to this aspect of the invention comprises at least a recording phase that is iteratively performed using an external-memory algorithm (or out-of-core algorithm), the recording phase comprising an acquisition pipeline and an eviction pipeline, wherein the acquisition pipeline is performed with a plurality of parallel threads comprising at least one master thread and a plurality of local threads, wherein the master thread comprises processing the master tree and the node cache.

The acquisition pipeline of the recording phase comprises
continuously receiving the point-cloud data in one or more input buffers,
computing a local tree for each of the local threads,
redistributing point-cloud data of the input buffers onto local nodes of the local structure, and
determining, for each local node whether the master tree comprises a corresponding node or not.

If the master tree comprises the corresponding node, the acquisition pipeline comprises determining if point cloud data for this node is present in the node cache, wherein if the point cloud data is present, the point cloud data is added to the node. If the master tree does not comprise the corresponding node, the acquisition pipeline comprises creating the corresponding node in the master tree and writing the point-cloud data comprised in the respective local node to the node cache.

The eviction pipeline of the recording phase comprises evicting, during the ongoing scanning process, point cloud data from the node cache and writing it to one or more hard drives or other non-volatile mass storage devices.

According to one embodiment of the method, the point-cloud data is continuously provided by at least one scanning device performing the ongoing scanning process and comprises coordinates for a multitude of points captured during the ongoing scanning process. The method optionally may comprise performing the scanning process.

In one embodiment, said at least one scanning device comprises at least one LIDAR system, wherein, in the course of the ongoing scanning process, each LIDAR system moves through an environment along a planned trajectory. Said environment may comprise a multitude of individual structures, and for instance can be a neighbourhood, a large facility, an infrastructure project or a building complex.

In another embodiment, evicting nodes from the node cache comprises a selection of which nodes are evicted, and said selection is based on a position and/or a trajectory of the at least one scanning device.

In another embodiment, the method further comprises continuously receiving a current position of the at least one scanning device, and said selection is based on a distance between a position of points comprised by the nodes and the current position.

In another embodiment, the method further comprises receiving a planned trajectory of the at least one scanning device for the ongoing scanning operation, and evicting nodes from the node cache is based on a distance between a position of points comprised by the nodes and a position of the at least one scanning device that is derived from the planned trajectory.

In another embodiment, when during the ongoing scanning process a position of a scanning device returns to an already scanned location—so that the scanning device provides new point-cloud data belonging to an existing node, previously provided point cloud data of which existing node having already been evicted from the node cache and written to the hard drive (or other non-volatile memory)—the method further comprises
reading a file comprising the previously provided point-cloud data from the hard drive and adding the new point-cloud data to the file, or
creating a duplicate node of the existing node, and writing the new point-cloud data to the duplicate node.

Duplicate nodes comprise duplicates of the same geometrical volumes in the tree. A decision on whether the new point-cloud data is added to the existing node or the duplicate node is created, may be made depending on an access speed of the hard drive (or any other non-volatile memory used). In particular, duplicate nodes are created when disk speed is low.

According to another embodiment, the method is performed using a computer system comprising a random-access memory and/or a GPU with a graphics memory (or an alternative volatile memory), wherein the node cache is provided in the random-access memory and/or in the graphics memory, and a total amount of point-cloud data provided during the ongoing scanning process is too large to fit into the random-access memory and/or graphics memory, particularly wherein the ongoing scanning process comprises scanning a large environment using one or more LIDAR systems moving through the environment. The method optionally may comprise performing such a scanning process.

According to another embodiment, the method comprises a recording phase and a redistribution phase that are sequentially and iteratively performed using an external-memory algorithm. The redistribution phase comprises identifying point cloud data belonging to the same master node that has been written to different files on the one or more hard drives, and determining whether the identified point cloud data exceeds a pre-defined size. If the identified point cloud data exceeds the pre-defined size, at least a subset of the identified point cloud data is redistributed to child nodes of the master node, and if the identified point cloud data does not exceed the pre-defined size, the identified point cloud data is merged to a single file.

According to another embodiment of the method, the acquisition pipeline comprises determining if point-cloud data of one or more nodes in the node cache exceeds a pre-defined size, and redistributing point-cloud data of such nodes onto local nodes of the local structure.

In one embodiment, an amount of point cloud data that is evicted from the node cache and/or a rate the point cloud data is evicted with is based on a limitation of a memory or data storage on which the node cache is provided, and further based on a quantity of point-cloud data that has been provided by at least one scanning device in a previous time period and/or a rate the point-cloud data is provided with.

According to another embodiment of the method, redistributing the point-cloud data of the input buffers onto the local nodes of the local structure comprises
sorting the points represented by the point-cloud data in the input buffers according to a certain order such as Morton order or Hilbert order,
constructing a local tree, using the sorted points to record leaf nodes for the local tree and fixing a level-of-detail (LOD) level of the leaf nodes of the local tree,
estimating a spatial distribution of the points by means of the leaf nodes of the local tree, and
redistributing, based on the estimated distribution, the points of the input buffer on the nodes of the local tree, starting from the root node.

According to another embodiment of the method, redistributing point-cloud data onto local nodes of the local octree structure comprises estimating a spatial repartition of the point-cloud data that allows an even and/or uniform distribution of the point-cloud data in the nodes of the master tree, particularly a distribution that avoids clustering effects.

According to another embodiment of the method, redistributing the point-cloud data of the input buffers onto the local nodes of the local octree structure comprises using a first-in-first-out (FIFO) queue, particularly wherein redistributing point-cloud data of nodes that exceed the predefined size onto local nodes of the local octree structure comprises using the FIFO queue.

According to another embodiment of the method, the point-cloud data in the node cache is written to a hard drive when the scanning process is finished. Thereby the data in the node cache is evicted in Morton order (or in a different order such as Hilbert order), and/or at least one node is identified that has duplicate cousin nodes, and all duplicate nodes of the identified node are read from the hard drive and merged to a single node.

According to another embodiment of the method, the eviction pipeline comprises writing a first subset of point-cloud data contained in a first master node to the hard drive, wherein a second subset of point-cloud data contained in the first master node is stored in the node cache.

According to another embodiment of the method, the eviction pipeline comprises
- identifying point-cloud data in the node cache that belongs to local nodes that is are duplicate nodes,
- writing point-cloud data of duplicate nodes to a first hard drive, and
- writing point-cloud data of duplicate nodes to a second hard drive.

The redistribution phase then may comprise
- identifying point-cloud data of duplicate nodes on the first hard drive,
- identifying, on the second hard drive, point-cloud data of duplicate nodes that corresponds to point-cloud data that has been identified on the first hard drive,
- merging point-cloud data of duplicate nodes from the first hard drive with the corresponding point-cloud data of duplicate nodes from the second hard drive, and
- writing the merged point-cloud data to the first hard drive.

According to another embodiment of the method, the octree structure is a level-of-detail (LOD) structure.

According to another embodiment, the method comprises performing said scanning process using at least one scanning device.

A second aspect of some aspects of the present invention pertain to a computer system comprising an interface for continuously receiving point-cloud data from at least one scanning device performing a scanning operation and an external-memory algorithm that is configured for performing the method according to the first aspect of the invention.

In one embodiment, the computer system comprises a volatile memory for storing a node cache and one or more hard drives or other mass storage devices. The system's components need not be positioned at the same location. For instance, a mobile device of the system may comprise a display for visualizing point-cloud data to a user, the volatile memory (RAM, graphics memory) and a limited data storage. Remote hard drives of the system can be accessible over the Internet and/or embodied as parts of a server cloud.

A third aspect of some embodiments of the present invention pertain to a real-time data acquisition system comprising the computer system of the second aspect and a scanning system comprising at least one scanning device, such as a LIDAR device. The at least one scanning device is configured for performing a scanning operation and generating point-cloud data comprising coordinates for a multitude of points captured during the scanning operation. The scanning system is configured for continuously—particularly in real time—providing the point-cloud data to the interface of the computer system.

A fourth aspect pertains to a computer programme product comprising programme code which is stored on a machine-readable medium, or being embodied by an electromagnetic wave comprising a programme code segment, and having computer-executable instructions for performing, in particular when run on a computer system according to the second aspect of the invention, the method according to the first aspect of the invention.

BRIEF DESCRIPTION OF THE DRAWINGS

The invention in the following will be described in detail by referring to exemplary embodiments that are accompanied by figures, in which.

DETAILED DESCRIPTION

Figure 1:
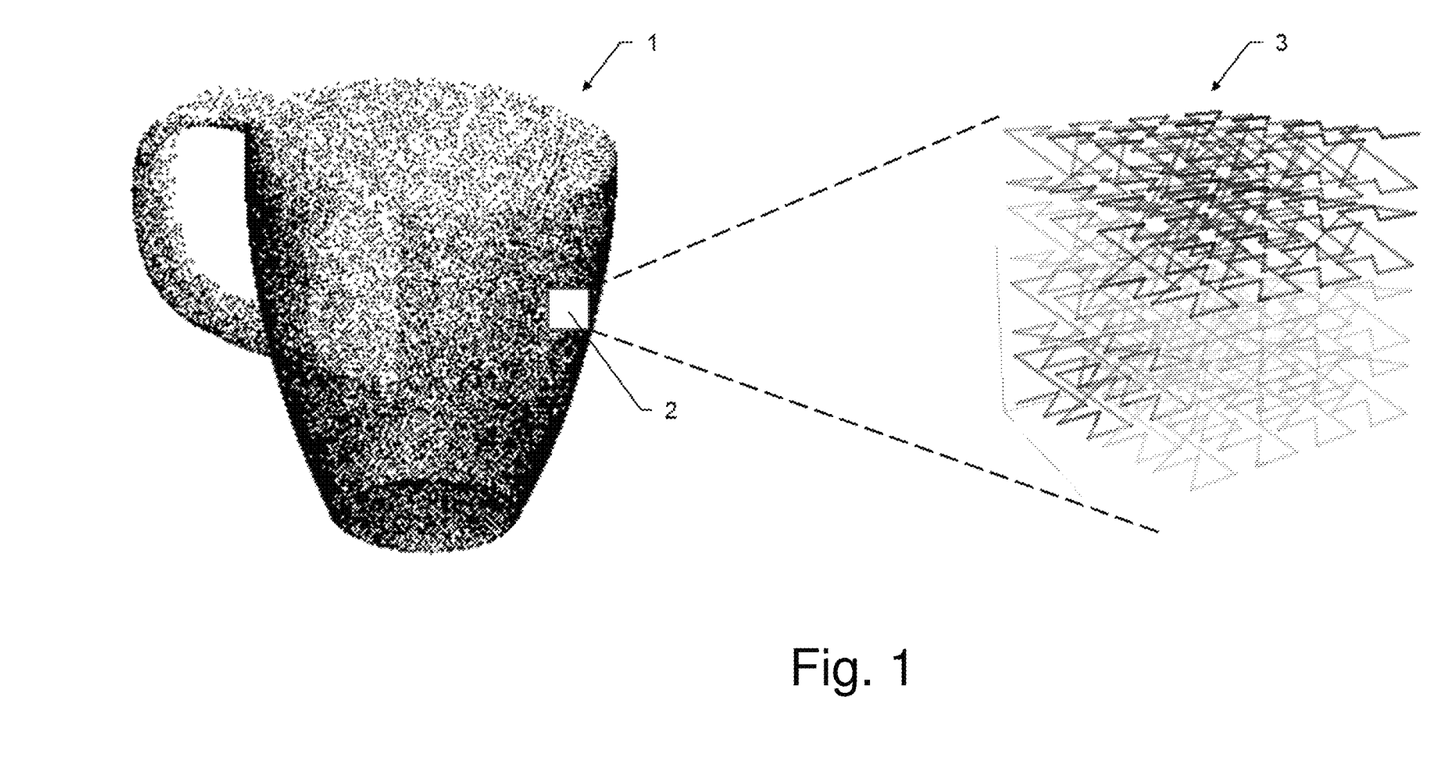
FIG. 1 shows a point cloud representation of a 3D object composed of a plurality of points and accordingly ordered Morton indices.

FIG. 1 shows an example of a point cloud representation of a 3D object as it could result from scanning with a LIDAR system. The point cloud 1 is composed of a multitude of points. The points are stored with their corresponding x, y and z coordinates and depending on the LIDAR system used also with associated intensity and colour, e.g. with RGB values. As schematically illustrated, typically, the point density varies throughout the object. The square area in the point cloud illustrates a processing bucket 2. The point data contained within the processing bucket 2 do not show any data dependency to surrounding point data. Therefore, the point data within the processing bucket 2 can be processed in parallel to point data contained within a plurality of other processing buckets. This method is described in detail in the applicant's European patent application No. 18176796.3. The point coordinates of the corresponding points are then converted to Morton indices by bitwise interleaving of the binary coordinate values. Here also further information e.g. intensity values or colour information can be contained in the binary representation of the point data. The Morton indices are sorted in ascending order which is graphically illustrated in the case of 3D point data by connecting the points following the space filling Morton curve 3. As LIDAR data result from scanning surfaces, points in close proximity to each other usually result in a more two-dimensional representation than schematically indicated in FIG. 1.

As described below, instead of using processing buckets as described with regard to FIG. 1, the point cloud data collected from the scanner may arrive in buffers, is distributed onto local trees and organized in local nodes that correspond to processing buckets. Opposed to techniques known in the art, each local node might have cousin nodes from other local trees, which are merged into a single master node on a master tree.

A pre-processing for a method according to the invention may be based on the conversion of point coordinates to Morton indices, the sorting of the Morton indices followed by applying an efficient leaf node generation algorithm which enables to obtain a tree index structure almost instantly. Thereby, the leaf node generation is based on a sequential scan (walk through) of the Morton indices with minimal back-tracking of the sorted array of Morton indices favourable for input-output operations when reading data from disk (out-of-core treatment). The resulting array of leaf nodes arranged in ascending order allows the computation of the tree index structure branch by branch, thus avoiding any costly recursive algorithm. The as-defined tree index structure has several levels each relating to a different level of detail (LOD). Thereby the LOD increases from top to the bottom of the tree, starting from the top root node going down to the leaf nodes wherein corresponding branches have nodes and are connected by nodes (branch nodes). In order to allow for efficient visualization respecting the characteristics of modern graphical processing unit (GPU) architectures, the nodes of the tree optionally may be quantized. The quantization consists in choosing a subset of the initial set of points lying in the respective node. This quantization can be done efficiently by applying a raster allowing for a compact (compressed) representation of the points in a lossy or lossless manner The tree index structure enables an efficient query of data of interest depending on a desired LOD during later 3D visualization.

Figure 2:
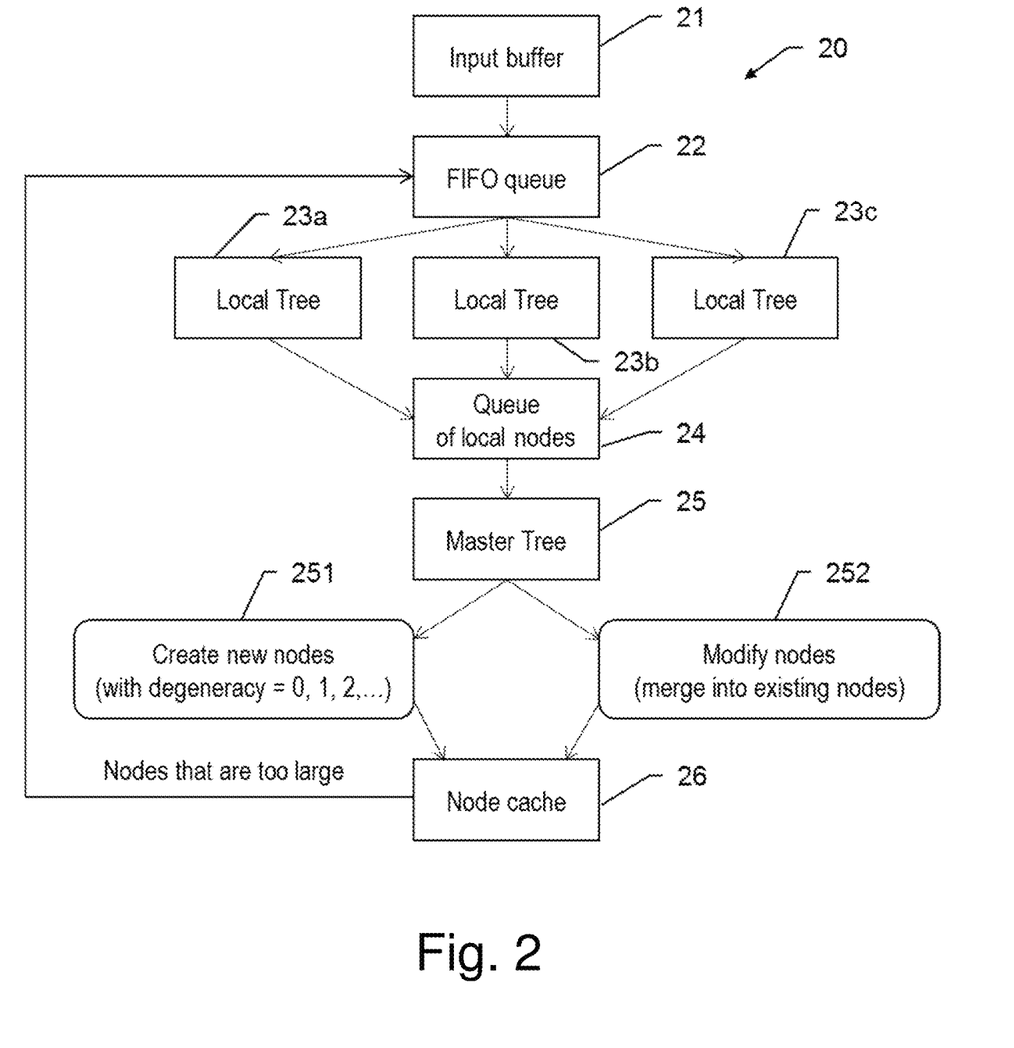
FIG. 2 illustrates the acquisition pipeline of a recording phase of an exemplary embodiment of a method according to the invention.
Figure 3:
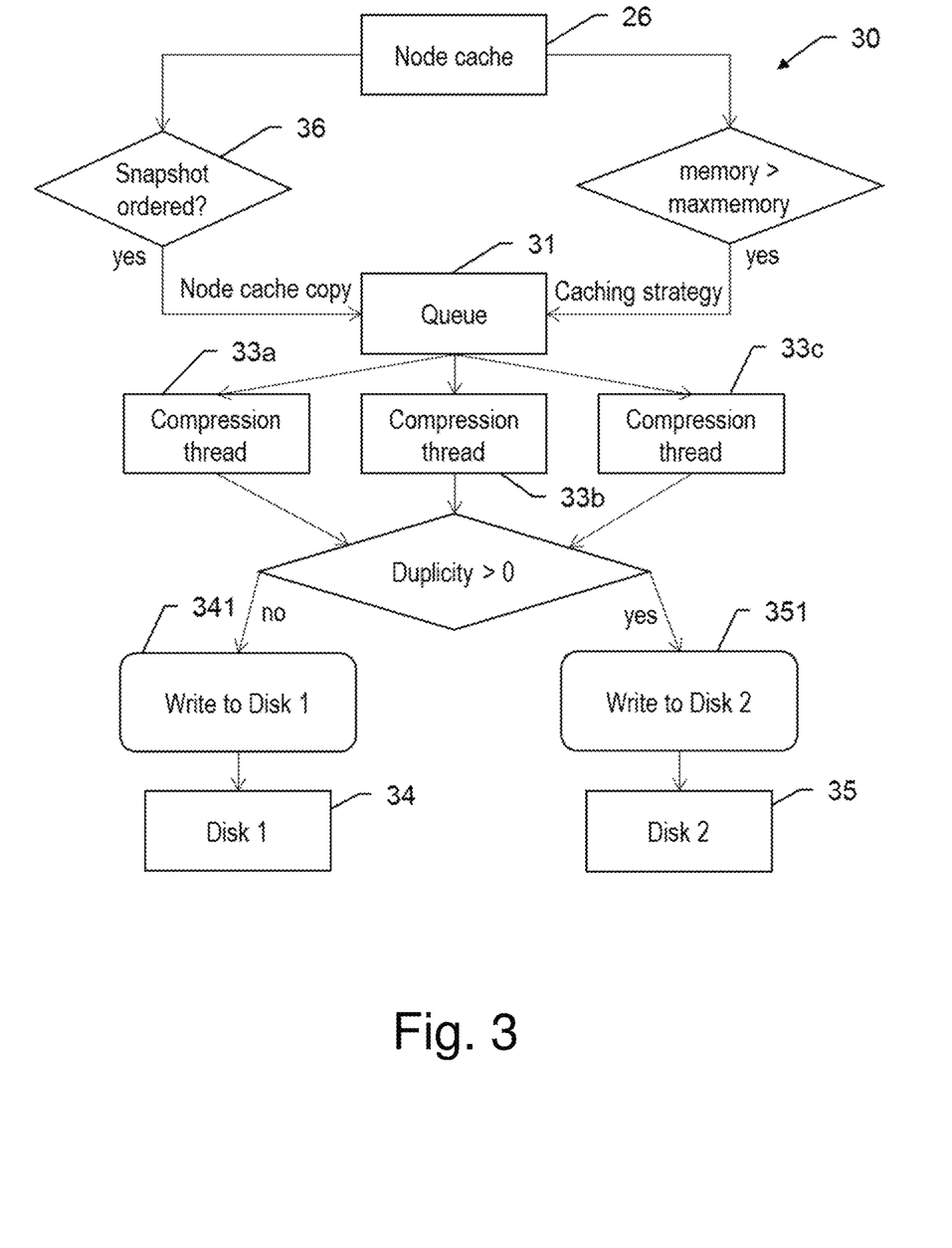
FIG. 3 illustrates the eviction pipeline of a recording phase of an exemplary embodiment of a method according to the invention.
Figure 4:
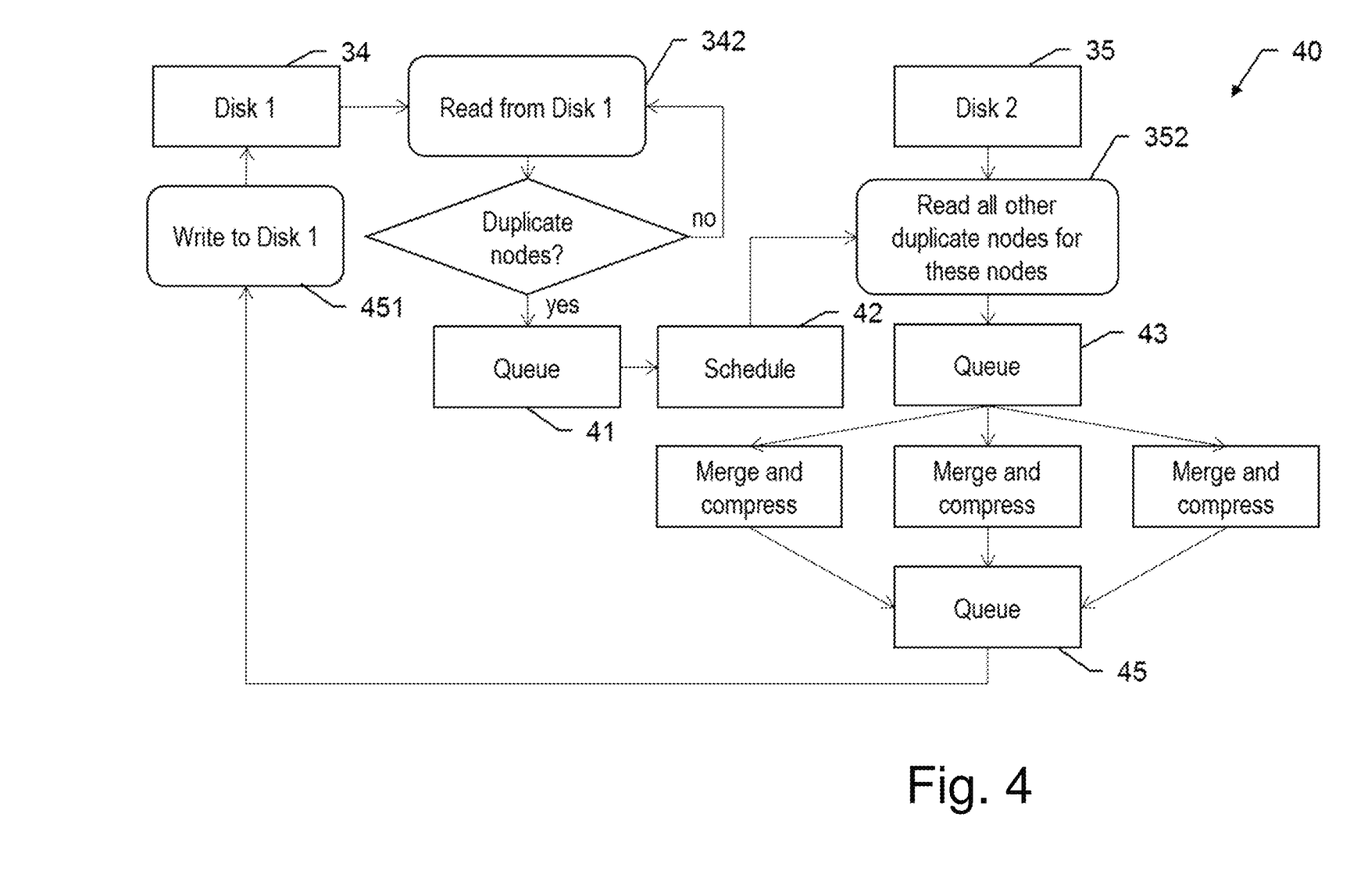
FIG. 4 illustrates the cleanup and redistribution phase of an exemplary embodiment of a method according to the invention.

According to some embodiments of the present invention, an algorithm produces a Level-of-Detail (LOD) structure during the scanning of a large 3D object or environment. The point cloud can be generated by different kind of data sources, such as light detection and ranging (LIDAR) scanning or photogrammetry. If the amount of data is very large, the entire data can neither fit into GPU memory nor into RAM memory. Proposed embodiments of a method according to the invention therefore comprise employing an out-of-core algorithm utilizing hard disks (or other non-volatile memory) to store data. The algorithm can be subdivided into two phases that are executed subsequently: the recording phase and the cleanup and redistribution phase. These phases of the algorithm are illustrated in FIGS. 2, 3 and 4.

An LOD structure is necessary in order to visualize large point clouds which do not fit into a computer system's volatile memory such as GPU memory. For instance, an octree may be used as an LOD structure. An octree is a tree data structure in which each internal node has exactly eight children. It can be used to partition a 3D space by recursively subdividing it into eight octants. Alternatively, other LOD structures can be used, particularly space-partitioning structures, such as for instance k-dimensional trees (k-d trees).

The presented algorithm allows to construct this octree while the scanning process is ongoing, i.e. not requiring the scanning to be completed before the generation of the LOD structure can be started. In order to be able to record points streamed in from scanning or similar devices, some special design of the algorithm is necessary to allow for the required speed and storage limitations. In preferred embodiments of the algorithm, this is achieved mainly by the following ingredients:

The algorithm is configured as an external memory algorithm (also out-of-core algorithm), i.e. optimized to efficiently fetch and access data stored in slow bulk memory such as hard drives or tape drives, or when memory is on a computer network.

Input stream buffers are directly pushed onto local threads in parallel processes, wherein a local octree is computed for each local thread.

The nodes of these local octrees are merged into a master octree residing on the master thread. This way, the expensive operation of distributing individual points onto different levels of detail is done in parallel, whereas the sequential parts of the algorithm manipulate only entire data buffers.

In order to avoid clustering effects of points and guarantee evenly and uniformly distributed points in the final nodes, the local point distribution takes advantage of the local octree to guess the spatial repartition of the points, allowing to "correctly" distribute the points onto the nodes of the local octree.

As the number of nodes in the master tree grows, the point data inside these nodes needs to be periodically dumped to disk in order to respect storage limitations. In order for the scanning process to be able to return to locations already scanned, node data can be reread from disk or duplicate nodes can be stored in the octree.

The decision which node data to dump can be chosen in order to account for the trajectory of the scanning process.

During the recording phase, buffers of points are streamed into the converter and re-distributed onto nodes of an octree. The points of these nodes are stored in a node cache. Once the number of points contained inside the nodes of the node cache reaches a threshold, some point buffers are evicted from the node cache and written to disk. These two processes, the acquisition pipeline and the eviction pipeline are illustrated in FIGS. 2 and 3. During the scanning process, the position of the scanner can return to the location of a node which already has been evicted from the node cache. In this case, two options are available, either re-reading the node from disk and adding the points to the node or, if disk speed is slow, allowing for duplicate nodes. This means duplicates of the same geometrical volumes are allowed in the tree. The cleanup and redistribution phase is sketched in FIG. 4. Once the scanning process is finished, the node cache is emptied and written to disk. Following, if a node has duplicate cousin nodes, all duplicate nodes for this node are read from disk and merged to a single node avoiding any duplication.

Acquisition Pipeline

FIG. 2 illustrates the acquisition pipeline 20. The aim of the acquisition pipeline is to generate an octree structure and to redistribute the points contained in the input buffers onto the nodes of the octree. The pipeline consists of several synchronous and asynchronous stages. Concurrent queues protected by mutexes are used to exchange data between the different processes running in parallel. At the beginning of the pipeline, an input buffer 21 with points, originating e.g. from a LIDAR scanner, is pushed onto a FIFO (first in, first out) queue 22. These buffers are then consumed by several threads (i.e. subsets of the process) generating a local tree structure with the points of the buffer redistributed onto the nodes of the local octree. In this simplified example, the local tree structure comprises three local trees 23a-c. The local redistribution of points is a complex process explained further below in the section "Local tree generation". It needs to ensure that points are redistributed uniformly onto nodes without clustering or other artifacts and respecting the target number of points, "nodeSize" for the final nodes. Once local nodes have been generated, they are pushed onto a queue 24 and are subsequently consumed by the unique master thread 25 (alternatively, a staged configuration of master threads can be used). This thread holds the master tree 25 and the node cache 26. For each node picked up from the queue of local nodes 24, we check whether the master tree 25 contains the respective node or not. If the node is not present in the master tree, we create 251 the node in the tree (and, if necessary, the missing parent nodes), and add the points contained in this node to the node cache 26. If the node is present in the master tree 25, we search for the point buffer of this node inside the node cache. If the point buffer is found, we add the points to the node 252. Otherwise, there are two options: One can either re-read the already written points of this node from disk, or increment the duplication count of the node in the master tree 25 and create 252 a new point buffer inside the node cache 26. The local redistribution should put only so many points into a node that after merging with other local nodes, the resulting final node contains approximately nodeSize of points. However, this is not always ensured, therefore we check that if one or more nodes contain more than "maxNodeSize" points. The points inside this or these particular node(s) are sent once more down the acquisition pipeline 20 and redistributed.

Eviction Pipeline

FIG. 3 illustrates the eviction pipeline 30. For small point clouds fitting into RAM, it might be enough to empty the node cache 26 once the scanning process is completed, but in many cases, the node cache 26 has to satisfy a certain memory threshold. Therefore, it is necessary to evict data from it on a regular basis. In particular, in order to hold the two pipelines—acquisition 20 and eviction 30—in balance, the data flux into the node cache 26 and out of the node cache 26 should be roughly equal in magnitude. A first step is to identify the point buffers which should be evicted from the node cache. The definition of this caching strategy is rather complex and can involve different parameters. Some caching strategies are described in more detail in the section "Caching strategy" further below. Subsequently, the chosen point buffers are pushed onto a queue 32 and compressed by several compression threads 33a-c before being written 341, 351 to disk 34, 35. In some cases, it might be advantageous to have point buffers originating from duplicate nodes written 351 to a separate disk 35 in order to improve efficiency during the cleanup and redistribution phase illustrated in FIG. 4.

At some points during the scanning, it might be desirable to visualize the current point cloud, e.g. as a snapshot. If such a visualization is ordered 36 it might be necessary to send a copy of the node cache 26 down the eviction pipeline.

Cleanup and Redistribution Phase

FIG. 4 illustrates some aspects of the cleanup and redistribution phase 40. In the recording phase, points coming from the scanner have been streamed into the pipeline and distributed onto the nodes of an octree. Once the scanning is finished—or if the computational resources allow also during scanning—, in the cleanup and redistribution phase, the points in the nodes of the octree are rebalanced in order to improve the quality of the LOD structure. This phase can be done "off-line".

Depending on the use case, duplicate nodes might have been produced during the recording phase 20, 30. In this case, it is necessary to merge the duplicate nodes to a single one and update the duplication count in the octree structure. This is done by starting from the higher LOD levels of the tree, as the number of points can surpass maxNodeSize when a number of duplicate nodes are collapsed into a single one. In this case excess points need to be redistributed onto nodes in lower LOD levels and, if necessary, new nodes need to be created.

In the shown example, nodes stored on a first disk 34 are read 342 whereby it is determined whether one or more nodes are duplicated nodes. In this case the identified duplicated nodes are pushed onto a queue 41 and a schedule 42 is generated, according to which from a second disk 35 all other duplicated nodes for the identified duplicated nodes are read 352. The duplicated nodes from both disks 34, 35 are pushed onto a queue 43, merged and compressed and finally pushed onto another queue 45 to be written 451 to the first disk 34.

Local Tree Generation

The local distribution of points is a central aspect of the presented algorithm. We start by converting the input buffer to a suitable format and sort the points according to Morton order. Alternatively, other spatial indexes such as Hilbert order or any other space filling curve may be used instead. We then construct a local tree, for instance as described in the applicant's earlier patent application EP18176796.3, thereby fixing the LOD level of the leaf nodes to $l_{min}$. The quantity $l_{min}$ should be chosen rather small in order to allow a fine spatial granularity of the input buffer. We go along the sorted buffer, record the leaf nodes and construct the octree structure using these leaf nodes. In the following, we redistribute the points of the input buffer on the nodes of this local tree, starting from the root node.

The basic principle of the presented point redistribution is to estimate the spatial distribution of the points by means of the leaf nodes of the local tree structure. This is done as follows:

We are given a parameter N>0 (this will be explained more in detail further below in the section "Returning nodes and updating the parameter N"). Given a local node at LOD level $l_0$, its volume is given by $V_0=2^3 l_0$. Assuming that this node has $m_0$ leaf nodes in the local tree at LOD level $l_{min}$ with volume $V_{min}=2^3 l_{min}$, we can define a volume ratio $\rho_0$ by:

$$\rho_0 = \frac{m_0 V_{min}}{V_0}.$$

The number of points $n_0$, we put into the present node is then approximated by $$n_0 = N\rho_0.$$

We then choose randomly $n_0$ points from the $m_0$ leaf nodes. We continue this procedure until there are no points left to be redistributed. The non-empty nodes are then pushed onto the queue of local nodes and consumed by the master thread. The above procedure avoids clustering artifacts when merging nodes in the master thread. The parameter N can be thought of as being a normalized density (with respect to $V_{min}$). It is a key parameter in order to ensure that the number of points contained in each node is neither too small nor too large but just around nodeSize. This will be discussed in more detail further below in the section "Returning nodes and updating the parameter N".

Master Thread and Master Tree

By design of the algorithm, the master thread is the CPU-related bottle neck, if sufficiently parallel threads are available. Therefore, it is important to optimize the workload in the master thread and the communication to and from the master thread in such a way that it is sub-dominant compared to the input-output workload when writing and reading from disk.

The master thread holds two important objects of the current algorithm, the master tree and the node cache containing the point buffers for the nodes. Each time a local thread passes a set of nodes to the master thread, it performs the following actions:

1. Search in the master tree: For each local node, we check if the node (and its parents) is contained in the master tree, otherwise we create it and adjust the children count in the parent node.

2. Search in the node cache: If the node has not been found in the master tree, we just add a new node in the node cache. If not, we check if the node cache contains the respective node and if so add its data to this node. Otherwise we duplication count in the node of the master tree and add a new point buffer to the node cache.

3. Returning nodes too large to the acquisition pipeline and updating the parameter N: This is explained in more detail in the next section.

4. Evicting the node cache: If the memory inside the node cache exceeds a threshold value, point buffers are evicted and sent down the eviction pipeline in order to be written to disk. An important ingredient in the eviction pipeline is the caching strategy determining which nodes are to be evicted. This is discussed further below in the section "Caching strategy".

In the described design, the master thread might represent a point of congestion. In this case, alternatively, the master thread can be replaced by a two- (or multi-) staged process, where local nodes are merged into subtrees which are finally merged into the master tree.

In addition, the point repartition in the local threads might be achieved by other algorithms estimating the spatial repartition of the points and selecting a subset of these points. For example, a uniform or random raster for each node might be used where the occupancy of the position is flagged.

Returning Nodes and Updating the Parameter N

As mentioned above, a correct choice of N is important in order to assure that the number of points in the final nodes corresponds at least roughly to nodeSize. However, guessing a value of N by means of some criteria, such as point density of the scanner, has revealed not to be successful, even for a relatively homogeneous repartition. In general, the spatial repartition of the points is heterogeneous for several reasons. First, the scanner distributes its points in radial direction, meaning that the point density is closer to the scanner than in the rest of the scanning region. In addition, the course of the scanning process (trajectory) adds to the unbalance, depending for example on the number of times a location is passed. Even for point clouds generated from photographs, the repartition is not as uniform as it could be. This can be seen in some data sets, where the overlaps of the flight stripes are much denser than the rest. In brief, the problem does not seem to be amendable by some spatial criteria. As space does not give us any evidence how to update N, a more promising approach is to use time as an indication of how to control N.

Each time a set of local nodes has been merged into the master tree and node cache, a check is performed on the number of points contained in each node of the node cache. If the number of points in a node exceeds maxNodeSize, the node is emptied and the points are placed into a buffer which is pushed onto the input queue and following passes down the acquisition pipeline. However, not only the points are returned into the acquisition pipeline, we also take this as an indication that the parameter N is chosen too large and reduce it by a certain factor.

On the other hand, we have to avoid that the final nodes contain too few points. Therefore, we increase N by a smaller factor in magnitude if after n steps no node exceeds maxNodeSize (or alternatively any other selected number).

Caching Strategy

Once the number of points contained in the nodes inside the node cache 26 reaches a threshold, the node cache needs to be emptied. This implies choosing a subset of point buffers contained in the node cache and handing down their data the eviction pipeline 30 as shown in FIG. 3. The caching strategy, i.e. the choice of nodes to evict, is important for performance A good strategy will minimize the number of writes to disk by reducing the number of duplicate nodes, which will subsequently also shorten the cleanup phase. As such, the caching strategy will depend on the specific use case. For example, in case the scanning process is completed and the results are saved as small files (e.g. in .las format), it is advantageous to process these small files in Morton order (or x-y order) and evict the node cache accordingly. Another use case can be that the position of the scanner is handed-over to the present converter and the node cache is evicted in function of the distance to the scanner or its preplanned trajectory (e.g. flight path).

In general, the caching strategy is based on the principle of data locality, meaning that the points streamed in during recording phase are somehow close to each other. As such, the described algorithm permits to reflect a scanning order, scanning sequence and/or scanning trajectory in the memory management of nodes in the LOD structure.

Although the invention is illustrated above, partly with reference to some preferred embodiments, it must be understood that numerous modifications and combinations of different features of the embodiments can be made. All of these modifications lie within the scope of the appended claims.

What is claimed is:

1. A computer-implemented method for real-time acquisition and visualization of point-cloud data of an ongoing scanning process, the point-cloud data comprising coordinates for a multitude of points, the method comprising:
   providing a node cache;
   providing a level-of-detail structure having a master tree and a local structure comprising a plurality of local trees;
   iteratively performing a recording phase using an external-memory algorithm, the recording phase comprising an acquisition pipeline and an eviction pipeline, wherein the acquisition pipeline is performed with a plurality of parallel threads comprising at least one master thread and a plurality of local threads, wherein the master thread comprises processing the master tree and the node cache, wherein the acquisition pipeline comprises:
      continuously receiving the point-cloud data in one or more input buffers,
      computing a local tree for each of the local threads,
      redistributing point-cloud data of the input buffers onto local nodes of the local tree structure,
      determining, for each local node whether the master tree comprises a corresponding node,
      if the master tree comprises the corresponding node, determining if point cloud data for this node is present in the node cache, wherein if the point cloud data is present, the point cloud data is added to the node, and if the master tree does not comprise the corresponding node, creating the corresponding node in the master tree and writing the point-cloud data comprised in the respective local node to the node cache, and evicting, during the ongoing scanning process, point cloud data from the node cache and writing the point cloud data to one or more hard drives; and visualizing at least a subset of the point-cloud data to a user before the ongoing scanning process ends.

2. The method according to claim 1, wherein the point-cloud data:

is continuously provided by at least one scanning device performing the ongoing scanning process, and comprises coordinates for a multitude of points captured during the ongoing scanning process.

3. The method according to claim 2, wherein:

evicting nodes from the node cache comprises a selection of which nodes are evicted, the selection being based on a position or a trajectory of the at least one scanning device.

4. The method according to claim 2, wherein during the ongoing scanning process, a position of a scanning device returns to an already scanned location, and the scanning device provides new point-cloud data belonging to an existing node, previously provided point cloud data of which existing node having already been evicted from the node cache and written to the hard drive, wherein the method further comprises:

reading a file comprising the previously provided point-cloud data from the hard drive and adding the new point-cloud data to the file, or creating a duplicate node of the existing node and writing the new point-cloud data to the duplicate node.

5. The method according to claim 1, wherein the method is performed using a computer system comprising a random-access memory or a graphics processing unit (GPU) with a graphics memory, wherein the node cache is provided in the random-access memory or in the graphics memory, and a total amount of point-cloud data provided during the ongoing scanning process is too large to fit into the random-access memory or graphics memory.

6. The method according to claim 1, further comprising a recording phase and a redistribution phase that are sequentially and iteratively performed using an external- memory algorithm, wherein the redistribution phase comprises:

identifying point cloud data belonging to the same master node that has been written to different files on the one or more hard drives, and determining whether the identified point cloud data exceeds a pre-defined size, wherein:

if the identified point cloud data exceeds the pre-defined size, at least a subset of the identified point cloud data is redistributed to child nodes of the master node, and if the identified point cloud data does not exceed the pre-defined size, the identified point cloud data is merged to a single file.

7. The method according to claim 1, wherein the acquisition pipeline comprises:

determining if point-cloud data of one or more nodes in the node cache exceeds a pre-defined size, and redistributing point-cloud data of such nodes onto local nodes of the local tree structure.

8. The method according to claim 1, wherein redistributing the point-cloud data of the input buffers onto the local nodes of the local structure comprises:

sorting the points represented by the point-cloud data in the input buffers according to Morton order or Hilbert order, constructing a local tree, using the sorted points to record leaf nodes for the local tree and fixing an LOD level of the leaf nodes of the local tree, estimating a spatial distribution of the points by means of the leaf nodes of the local tree, and redistributing, based on the estimated distribution, the points of the input buffer on the nodes of the local tree, starting from the root node.

9. The method according to claim 1, wherein redistributing point-cloud data onto local nodes of the local tree structure comprises estimating a spatial repartition of the point-cloud data that allows an even or uniform distribution of the point-cloud data in the nodes of the master tree.

10. The method according to claim 1, wherein redistributing the point-cloud data of the input buffers onto the local nodes of the local tree structure comprises using a FIFO queue.

11. The method according to claim 1, wherein, when the scanning process is finished, the point-cloud data in the node cache is written to a hard drive, wherein:

the data in the node cache is evicted in Morton order or Hilbert order, or at least one node is identified that has duplicate nodes in other trees, and all duplicate nodes of the identified node are read from the hard drive and merged to a single node.

12. The method according to claim 1, wherein the eviction pipeline comprises writing a first subset of point-cloud data contained in a first master node to the hard drive, wherein a second subset of point-cloud data contained in the first master node is stored in the node cache.

13. A computer system comprising:

an interface for continuously receiving point-cloud data from at least one scanning device performing a scanning operation, and an external-memory algorithm for performing the method of claim 1.

14. A real-time data acquisition system comprising the computer system of claim 13 and a scanning system comprising at least one scanning device, wherein:

the at least one scanning device is configured for performing a scanning operation and generating point-cloud data comprising coordinates for a multitude of points captured during the scanning operation, and the scanning system is configured for continuously providing the point-cloud data to the interface of the computer system, particularly in real time.

15. A computer program product comprising program code which is stored on a machine-readable medium and having computer-executable instructions for performing the method according to claim 1.

* * * * *